(12) United States Patent
Mao

(10) Patent No.: US 11,115,097 B2
(45) Date of Patent: Sep. 7, 2021

(54) ADAPTIVE EXPLICIT CSI FEEDBACK AND OVERHEAD REDUCTION

(71) Applicant: Nokia Technologies Oy, Espoo (FI)

(72) Inventor: Xiaomao Mao, Hangzhou (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/477,220

(22) PCT Filed: Dec. 28, 2017

(86) PCT No.: PCT/FI2017/050946
§ 371 (c)(1),
(2) Date: Jul. 11, 2019

(87) PCT Pub. No.: WO2018/142016
PCT Pub. Date: Aug. 9, 2018

(65) Prior Publication Data
US 2019/0363774 A1 Nov. 28, 2019

Related U.S. Application Data

(60) Provisional application No. 62/453,699, filed on Feb. 2, 2017.

(51) Int. Cl.
*H04B 7/06* (2006.01)
*H04B 7/0417* (2017.01)
*H04B 7/0456* (2017.01)

(52) U.S. Cl.
CPC ......... *H04B 7/0626* (2013.01); *H04B 7/0417* (2013.01); *H04B 7/0478* (2013.01); *H04B 7/0639* (2013.01)

(58) Field of Classification Search
None
See application file for complete search history.

(56) References Cited

U.S. PATENT DOCUMENTS

| 2003/0068983 A1 | 4/2003 | Kim et al. ............... 455/69 |
| 2003/0109226 A1 | 6/2003 | Brunner et al. ......... 455/69 |

(Continued)

FOREIGN PATENT DOCUMENTS

| WO | WO-2009/003423 A1 | 8/2009 |
| WO | 2017/004546 A1 | 1/2017 |

OTHER PUBLICATIONS

"Linear Combination Based CSI Report for NR MIMO", 3GPP TSG RAN WG1 Meeting #87, R1-1611419, Agenda : 7.1.3.3, ZTE, Nov. 14-18, 2016, 5 pages.

(Continued)

*Primary Examiner* — Shripal K Khajuria
(74) *Attorney, Agent, or Firm* — Harrington & Smith

(57) ABSTRACT

A method including evaluating a number of constituent precoders to be used in providing a single precoder to include in an explicit channel state information (CSI) report, to be transmitted from a user terminal to at least one device in a network, and combining the constituent precoders to form the single precoder in response to a determination that the number of constituent precoders to be used in providing the single precoder is greater than one. The method includes configuring to signal to transmit the explicit CSI report including the single precoder from the user terminal to the at least one device in the network.

15 Claims, 6 Drawing Sheets

(56) References Cited

U.S. PATENT DOCUMENTS

| | | | |
|---|---|---|---|
| 2010/0185716 | A1 | 7/2010 | Nakamura et al. |
| 2011/0002406 | A1 | 1/2011 | Ming et al. |
| 2012/0099470 | A1 | 4/2012 | Li et al. |
| 2012/0113897 | A1 | 5/2012 | Thiele et al. |
| 2012/0115427 | A1* | 5/2012 | Hui .................. H04B 7/0417 455/226.1 |
| 2013/0089040 | A1 | 4/2013 | Tabet et al. |
| 2013/0201912 | A1* | 8/2013 | Sheng .............. H04B 7/0634 370/328 |
| 2014/0056379 | A1* | 2/2014 | Jongren ............ H04L 25/49 375/267 |
| 2016/0134342 | A1 | 5/2016 | Kneckt et al. |

OTHER PUBLICATIONS

"3rd Generation Partnership Project; Technical Specification Group Radio Access Network; Evolved Universal Terrestrial Radio Access (E-UTRA); Physical layer procedures (Release 14)", 3GPP TS 36.213 V14.1.0, Dec. 2016, p. 1-414.

"Clarification on Explicit Feedback vs. Implicit Feedback", 3GPP TSG RAN WG1 Meeting #60, R1-100926, Agenda : 7.2.4.1, Alcatel-Lucent Shanghai Bell, Feb. 22-26, 2010, 2 pages.

International Search Report and Written Opinion received for corresponding Patent Cooperation Treaty Application No. PCT/FI2017/050946, dated Mar. 19, 2018, 20 pages.

"Discussion of Advanced CSI Feedback", 3GPP TSG-RAN WG1 #86bis, R1-1609464, Agenda : 7.2.2.1.1, Intel Corporation, Oct. 10-14, 2016, pp. 1-6.

Samsung et al.; "More than 2 antennas TxD: Extension for CL-MIMO, rev 2"; TSG R1#24 R1-02-0xxx; 3GPP TSG RAN WG1; Orlando, USA; Feb. 18-22, 2002; whole document (11 pages).

* cited by examiner

| Codebook index, $n$ | Number of layers $\upsilon$ | |
|---|---|---|
| | 1 | 2 |
| 0 | $\frac{1}{\sqrt{2}}\begin{bmatrix}1\\1\end{bmatrix}$ | $\frac{1}{2}\begin{bmatrix}1 & 1\\1 & -1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\j & -j\end{bmatrix}$ |
| 2 | $\frac{1}{\sqrt{2}}\begin{bmatrix}1\\j\end{bmatrix}$ | — |
| 3 | $\frac{1}{\sqrt{2}}\begin{bmatrix}1\\-j\end{bmatrix}$ | — |

Fig. 3

ADAPTIVE EXPLICIT CSI FEEDBACK AND OVERHEAD REDUCTION

TECHNICAL FIELD

The teachings in accordance with the exemplary and non-limiting embodiments relate generally to explicit Channel State Information (CSI) feedback.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Implicit CSI feedback is a CSI feedback method based on a predefined codebook (see, R1-100926, 3GPP TSG RAN WG1 Meeting #60). The UE may estimate the channel and calculate a best rank/precoder selected within the predefined codebook, then provide feedback indicating the rank/precoder index to the eNB/gNB.

In some instances, UE assisted dynamic eigenvector reporting may be implemented. In these instances, the number of the total reported eigenvectors may be determined based on UE measurement. Although UE assisted dynamic eigenvector reporting adapts to the number of reported eigenvectors, the total report overhead will increase linearly with the number of reported eigenvectors.

Certain abbreviations that may be found in the description and/or in the Figures are herewith defined as follows:

BRIEF SUMMARY

This section is intended to include examples and is not intended to be limiting.

In an example of an embodiment, a method is disclosed that includes evaluating a number of constituent precoders to be used in providing a single precoder to include in an explicit channel state information (CSI) report, to be transmitted from a user terminal to at least one device in a network, combining the constituent precoders to form the single precoder in response to a determination that the number of constituent precoders to be used in providing the single precoder is greater than one, and configuring to signal to transmit the explicit CSI report including the single precoder from the user terminal to the at least one device in the network.

An example of an apparatus includes at least one processor; and at least one non-transitory memory including computer program code, the at least one memory and the computer program code configured to, with the at least one processor, cause the apparatus, wherein the apparatus may comprise a user terminal, to perform at least the following: evaluate a number of eigenvectors to be used in providing a single vector to include in an explicit channel state information (CSI) report, to be transmitted from a user terminal to at least one device in a network; combine the eigenvectors to form the single vector in response to a determination that the number of eigenvectors to be used is greater than one; and configure to signal to transmit the explicit CSI report including the single vector from the user terminal to the at least one device in the network.

An example of an apparatus includes at least one processor; and at least one non-transitory memory including computer program code, the at least one memory and the computer program code configured to, with the at least one processor, cause the apparatus to cause performance of a method according to the above example embodiment of a method.

An example of an apparatus means for evaluating a number of eigenvectors to be used in providing a single vector to include in an explicit channel state information (CSI) report, to be transmitted from a user terminal to at least one device in a network; means for combining the eigenvectors to form the single vector in response to a determination that the number of eigenvectors to be used is greater than one; and means for configuring to signal to transmit the explicit CSI report including the single vector from the user terminal to the at least one device in the network.

BRIEF DESCRIPTION OF THE DRAWINGS

The foregoing and other aspects of embodiments of this invention are made more evident in the following Detailed Description, when read in conjunction with the attached Drawing Figures, wherein:

FIG. 3 is a table illustrating rank 2 codebook for 2 ports as shown in 3GPP 36.213;

DETAILED DESCRIPTION

In the example embodiments as described herein a novel method and apparatus is proposed to implement an explicit CSI reporting method in which a device (such as a UE) may report one vector, which may be a dominant eigenvector, or a single vector that may be a combination of multiple eigenvectors, according to the angular spread at an eNB/gNB and a UE speed. The overhead may be fixed for particular port configurations based on the one vector (dominant eigenvector or single vector) that is reported.

Figure 1:
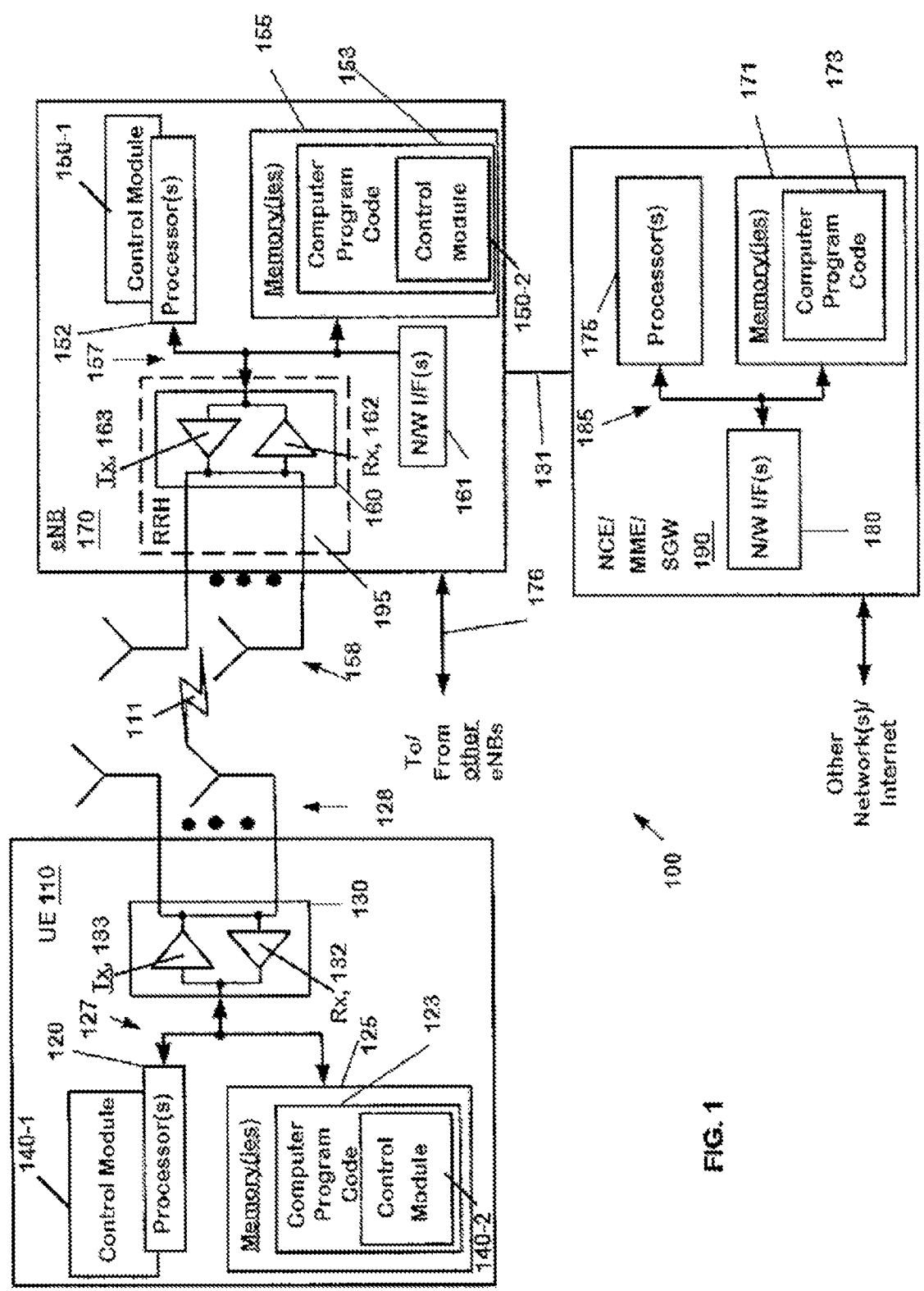
FIG. 1 is a block diagram of one possible and non-limiting exemplary system in which the exemplary embodiments may be practiced.

Turning to FIG. 1, this figure shows a block diagram of one possible and non-limiting exemplary system in which the exemplary embodiments may be practiced. In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a control module 140, comprising one of or both parts 140-1 and/or 140-2, which may be implemented in a number of ways. The control module 140 may be implemented in hardware as control module 140-1, such as being implemented as part of the one or more processors 120. The control module 140-1 may be implemented also as an integrated circuit or through other hardware such as a programmable gate array. In another example, the control module 140 may be implemented as control module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with eNB 170 via a wireless link 111.

The eNB (evolved NodeB) 170 is a base station (e.g., for LTE, long term evolution) that provides access by wireless devices such as the UE 110 to the wireless network 100. The eNB 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The eNB 170 includes a control module 150, comprising one of or both parts 150-1 and/or 150-2, which may be implemented in a number of ways. The control module 150 may be implemented in hardware as control module 150-1, such as being implemented as part of the one or more processors 152. The control module 150-1 may be implemented also as an integrated circuit or through other hardware such as a programmable gate array. In another example, the control module 150 may be implemented as control module 150-2, which is implemented as computer program code 153 and is executed by the one or more processors 152. For instance, the one or more memories 155 and the computer program code 153 are configured to, with the one or more processors 152, cause the eNB 170 to perform one or more of the operations as described herein. The one or more network interfaces 161 communicate over a network such as via the links 176 and 131. Two or more eNBs 170 communicate using, e.g., link 176. The link 176 may be wired or wireless or both and may implement, e.g., an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the eNB 170 being physically in a different location from the RRH, and the one or more buses 157 could be implemented in part as fiber optic cable to connect the other elements of the eNB 170 to the RRH 195.

The wireless network 100 may include a network control element (NCE) 190 that may include MME (Mobility Management Entity)/SGW (Serving Gateway) functionality, and which provides connectivity with a further network, such as a telephone network and/or a data communications network (e.g., the Internet). The eNB 170 is coupled via a link 131 to the NCE 190. The link 131 may be implemented as, e.g., an S1 interface. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, eNB 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Having thus introduced one suitable but non-limiting technical context for the practice of the exemplary embodiments of this invention, the exemplary embodiments will now be described with greater specificity.

According to an example embodiment of an explicit CSI reporting method, one dominant eigenvector or one vector which is a combination of multiple eigenvectors may be reported according to the angular spread at the eNB 170 (or gNB) and UE 110 speed. As only one vector will be reported, the overhead is fixed for a certain port configuration. However, reporting one dominant eigenvector or one vector which is a combination of multiple eigenvectors may achieve diversity gain comparable to multiple eigenvectors being reported in a high eNB 170 (or gNB) angular spread or high UE 110 speed scenario, and high beamforming gain in instances in which one dominant eigenvector is reported in a low 170 (or gNB) angular spread and low UE 110 speed scenario.

With regard to CSI feedback from UEs 110, systems or devices may require extensive simulations to determine the optimal number of eigenvectors that is to be reported so that the best tradeoff between overhead and performance may be attained. For example, 3GPP LTE MIMO may support up to 32 ports for transmission, and up to rank 8 for transmission. Further, the actual number of reported eigenvectors may be UE-specific and highly dependent on the channel characteristic between eNB 170 (or gNB) and UE 110. In instances in which the angular spread at the eNB 170 (or gNB) is high and all channel paths contribute similarly to the received signal, reporting multiple eigenvectors may enable the system to achieve diversity gain and, in instances of MU transmission, the reporting of multiple eigenvectors may provide greater flexibility for beam allocation (when compared to reporting of a single eigenvector). In contrast, in instances in which the angular spread at the eNB 170 (or gNB) is low, transmitting with full power by the dominant eigenvector (as the dominant beam) produces the best beamforming gain. In addition to angular spread, UE 110 speed is another factor impacting the number of reported eigenvectors. When determining the tradeoff between overhead for reporting eigenvectors and performance, for a high speed UE 110, more reported eigenvectors may provide more diversity and therefore more robust performance, while a single dominant eigenvector may be preferable for low speed UEs 110 as high beamforming gain is achieved with low overhead.

UE 110 speed may be determined based on the Doppler offset (which may be estimated) and which may then be used in calculating the speed of UE 110. Angular spread may be linked to rank estimation (such as performed by the UE 110). The number of eigenvectors may be combined based on the reported rank from the UE 110. For example, in instances in which the UE 110 reports rank 2, two eigenvectors may be combined, if the UE 110 reports rank x (where x is a positive integer greater than one), the system (for example, the UE 110 or eNB 170) may combine x eigenvectors.

Angular spread is a measuring for channel characteristics, eigenvectors can be seen multiple paths, the associated eigenvalues may be seen as the scaling of signal power on each of the multiple path. If the total power is spread across several paths, for example. In instances in which there are several eigenvectors with non-zero eigenvalues, the angular spread may be defined (or determined) to comprise high angular spread. In instances in which there are only a few non-zero eigenvalues, or, in extreme instances in which there is only one non-zero eigenvalue, the angular spread may be defined (or determined) to comprise small angular spread (for example, in a line of sight case).

Explicit CSI feedback may be applied to LTE enhanced Full Dimension (eFD) MIMO and NR MIMO. Explicit CSI feedback may be transmitted by a UE 110 reporting in terms of quantized amplitudes and phases of the channel covariance matrix or the corresponding eigenvectors (for example, using PUCCH, PUSCH, etc.). Specifically, the eNB 170 (or gNB) may determine the reporting bit width of the coefficients and phases, and then the UE 110 may quantize the estimated channel covariance matrix or eigenvector elements according to the bit width and feed the results back to the eNB 170 (or gNB). For sparse channels, eigenvector reporting may be efficient, as only one or two eigenvectors with non-zero eigenvalues may be required to be fed back, and these eigenvectors represent the main channel paths between the eNB 170 (or gNB) and the UE 110.

In MIMO/beamforming (BF) implementation, either UE-to-eNB feedback or reciprocity-based uplink channel estimation may be used to provide CSI to enable MIMO/BF operation at the eNB 170. In addition to rank (RI) and channel quality (CQI) indication feedback from the UEs 110, the selection of the precoding matrix (note that a vector is a one dimensional matrix) as a precoder from a predefined codebook based on precoding matrix indicator (PMI) feedback from the UE 110, or the selection of the transmit beamforming weight as a beam based on UE 110 uplink channel estimates, may be utilized for optimizing MIMO/BF system performance. For the UE-to-eNB feedback method, implicit CSI feedback may use a predefined codebook and report of PMIs. Explicit CSI feedback may use UE 110 feedback directly to provide precoders (precoding vectors) by quantizing the phase and amplitude of each element of the precoders.

In explicit CSI feedback, the UE 110 provides feedback precoders (precoding vectors) to the eNB 170. The UE 110 may calculate the precoder using an eigen based method, calculate the channel covariance matrix and apply eigen decomposition and use the resulting eigenvectors as the precoders.

According to example embodiments, based on the eigen-decomposition of the channel covariance matrix, the UE 110 may report one dominant eigenvector or one vector which is a combination of multiple eigenvectors, in order to achieve the best trade-off between overhead and performance. Specifically, the channel covariance matrix R may be defined based on UE 110 channel estimation and eigen-decomposition may be applied to R. The eigen-decomposition of R may produce eigenvectors $U=(U_0, U_1, \ldots, U_N)$ and corresponding eigenvalues $\Lambda=(\lambda_0, \lambda_1, \ldots \lambda_N)$ (assuming the eigen values are listed in a decreasing order), where $U_0$ and $\lambda_0$ denotes the dominant eigenvector and eigenvalue. H denotes a Hermitian operator.

$$R = U\Lambda U^H \qquad (1)$$

$$\Lambda = (\lambda_0, \lambda_1, \ldots, \lambda_N) \qquad (2)$$

$$U = (U_0, U_1, \ldots, U_N) \qquad (3)$$

Figure 2:
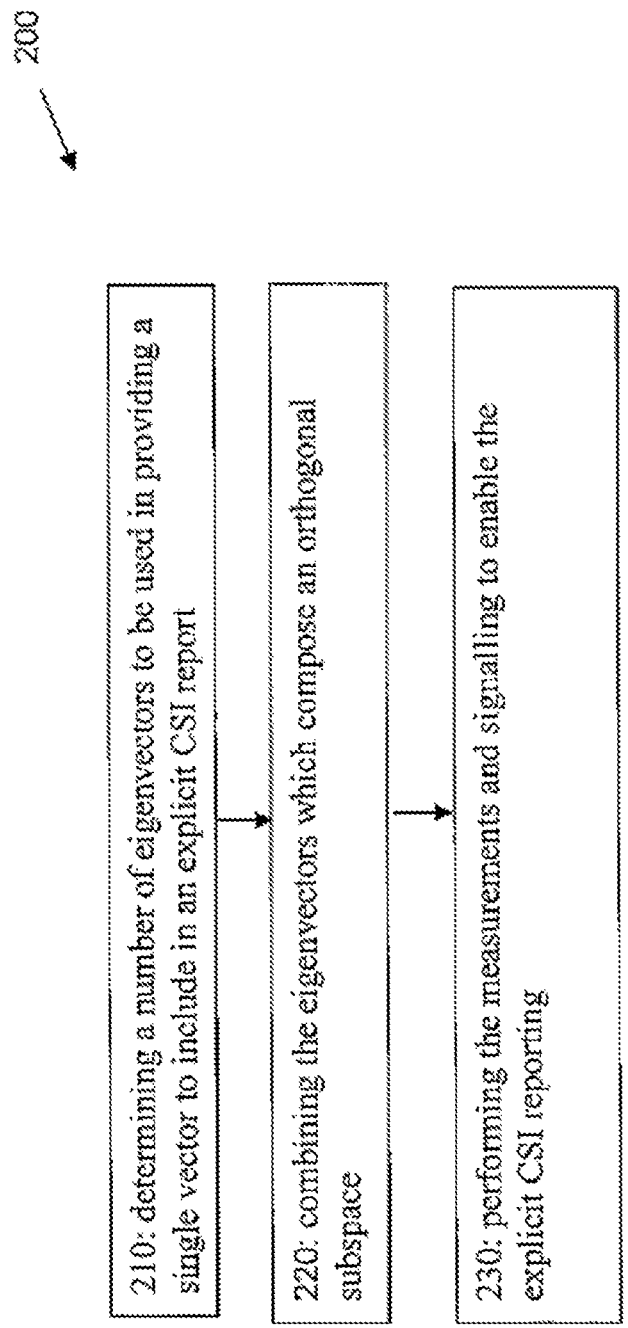
FIG. 2 shows an example of a method which may be performed by an apparatus.

Referring to FIG. 2 an example method for implementing an explicit CSI reporting method in which a device (such as a UE 110) may report one vector, which may be a dominant eigenvector, or a single vector that is a combination of multiple eigenvectors, according to the angular spread at an eNB 170 (or gNB) and a UE 110 speed is shown.

An example embodiment of the explicit CSI reporting method 200 includes three parts, as shown in FIG. 2. At block 210, the first part of the explicit CSI reporting method may include determining a number of eigenvectors to be used in providing a single vector to include in an explicit CSI report. According to an embodiment, this may include determining a number of eigenvectors to combine. This may be done by measuring the angular spread of the transmission from the eNB 170 (or gNB) to the UE 110, the UE 110 speed, or a combination of measuring both the eNB 170 angular spread and the UE 110 speed. Alternatively, the method may include selecting a dominant eigenvector (in other words, selecting one single vector).

At block 220, in instances in which multiple eigenvectors are determined, the second part of the explicit CSI reporting method may include determining a manner of combining the eigenvectors, which (for non-zero eigenvectors) compose an orthogonal subspace. The non-zero eigenvectors may be used as an orthogonal basis to build (or determine) one vector carrying the necessary channel spatial information.

At block 230, the third part of the explicit CSI reporting method may include performing the measurements and signalling to enable the explicit CSI reporting (for example, from the UE 110 to the eNB 170 or other component of network 100).

Example embodiments may be targeted to explicit CSI reporting in high angular spread and high UE 110 speed scenarios, for which high rank transmission is not required and in which a transmission with a rank indicator of rank 2 is sufficient for reporting requirements. High rank transmission brings more inter-layer interference than low rank transmission, are more suitable for stable channel because the high speed scenario cannot achieve high rank transmission. After acquiring the feedback dominant eigenvector or the vector as a combination of several eigenvectors, the eNB 170 may construct orthogonality between polarizations based on the feedback vector if a cross-polarized antenna array is used, and may thereby perform rank 2 transmission using the explicit CSI reporting method 200. An example of constructing rank 2 precoder may use the rank 2 codebook (second column) in 3GPP 36.213 table 7.2.4-18 (table 300 in FIG. 3), for example as shown in FIG. 3. As shown in FIG. 3, table 300 includes a codebook index 310 and columns 320 and 330 corresponding to a number of layers.

Figure 4:
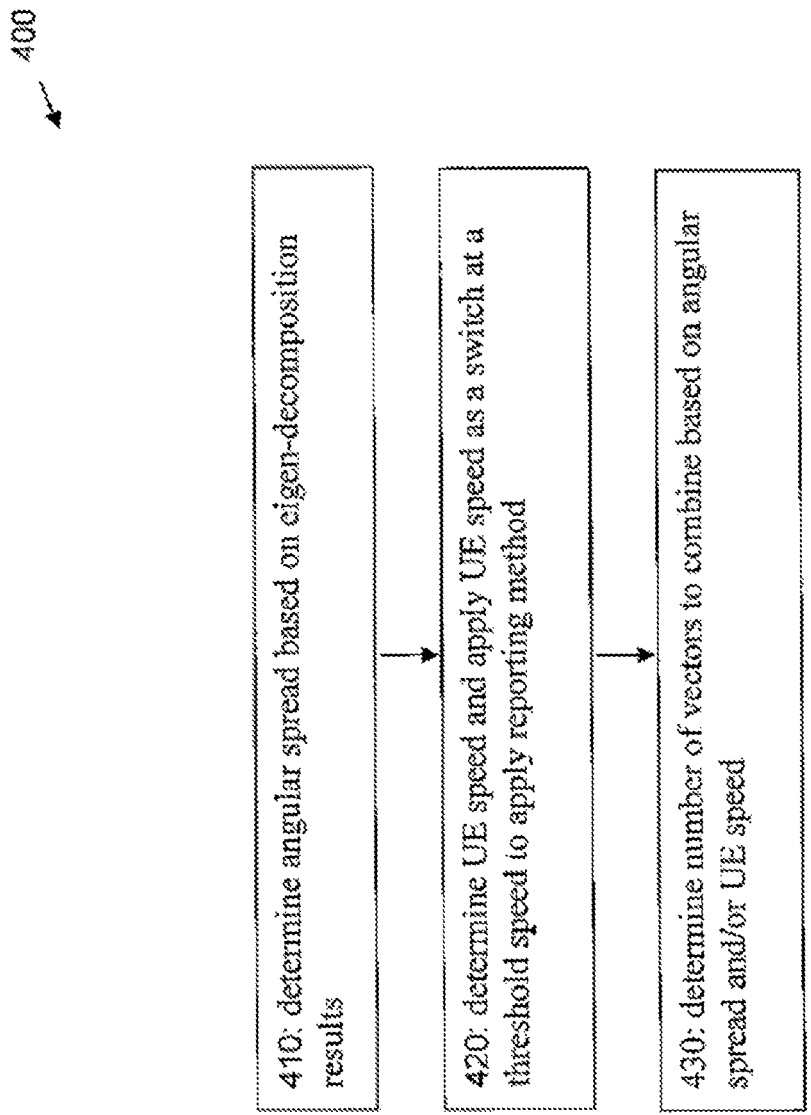
FIG. 4 shows an example of a method which may be performed by an apparatus.

Referring to FIG. 4 an example method for determining the number of eigenvectors to combine, for example with respect to implementing block 210 of method 200, is shown.

When determining the number of combined eigenvectors the angular spread may be reflected by (or determined based on) the eigen-decomposition results as shown at block 410. The eigenvectors represent the channel paths with different steering while the eigenvalues represent the power gains for the channel paths. If the eigen-decomposition results include several non-zero eigenvalues that are quite similar and the eigenvectors associated with them span a wide steering direction, the angular spread may be determined to be high. Specifically, angular spread may be calculated as $$\sqrt{\sum_i \lambda_i \cdot (s(U_i))^2 - \left(\sum_i \lambda_i \cdot s(U_i)\right)^2} \quad (4)$$

The definition of the symbols are as follows: Threshold $\rho$ defines the power gain difference and threshold $\xi$ defines the steering direction difference, and if $\lambda_0 - \lambda_i < \rho$ and $s(U_0) - s(U_i) < \xi$, eigenvector $U_i$ should be fed back. It only i=0 satisfies the aforementioned conditions, then only the dominant eigenvector is reported. If t=1, eigenvectors $U_0, \ldots U_i$ may be combined into one vector and this vector may be reported. Here, s(*) represents the function abstracting the steering direction for the precoder or eigenvector.

An exemplary embodiment of an implementation to calculate the steering direction of an eigenvector is shown as below, for the dominant eigenvector $U_0$, $$U_0 = [u_{0,0}, \ldots u_{0,N-1}] \quad (5)$$

$$s(U_0) = \text{angle}\left(\frac{1}{N-1}\sum_{i=0}^{N-2} u_{0,i}^* \cdot u_{0,i+1}\right) \quad (6)$$

In which N represents the number of antenna ports and angle (*) returns the phase information from a complex number. Similarly, the steering direction of other eigenvectors may be determined. Another embodiment to calculate the number of combined eigenvectors may be based on the rank estimation. The Number of rank indicates the best number of transmission layers. The estimation may be performed based on the trade-off between spatial multiplexing and inter-layer interference. In instances in which rank j is reported, the first j eigenvectors may be combined and provided as feedback to eNB 170 (or gNB).

UE 110 speed is another factor that may be determined (as shown at block 420) and considered (or used as a basis for calculation) when determining the combined eigenvector. Explicit CSI feedback may be effective in instances in which UE 110 speed is low. For a high UE 110 speed scenario, implicit CSI feedback (for example, codebook based) may outperform explicit feedback, which depicts the channel in more detail and thus requires a relatively static environment to provide superior feedback in comparison to implicit feedback. Explicit CSI feedback provides higher resolution of channel and may bring better performance than implicit CSI feedback. However, in instances in which the speed exceeds a particular threshold, the advantage of explicit CSI feedback may be overridden and may even bring less favorable performance than implicit CSI feedback. Therefore, an example embodiment may use the UE 110 speed measurement as a switch enabling the combined vector feedback when UE 110 speed is high and explicit feedback is configured. Specifically, we define a UE 110 speed threshold $\tau$. In other instances the speed threshold may include a velocity threshold (for example, the threshold may be determined based on the direction of the UE 110). If UE 110 speed $v \geq \tau$, then combined vector feedback will be enabled. The speed of a UE 110 may be calculated based on Doppler, an exemplary implementation may be $$\Delta f = \frac{v}{c} f_0 \quad (7)$$

Where, $\Delta f$ is the Doppler offset, $f_0$ is the carrier frequency and c is the speed of light.

At block 430, the number of eigenvectors to be combined may be determined based on the angular spread and/or UE 110 speed.

Figure 5:
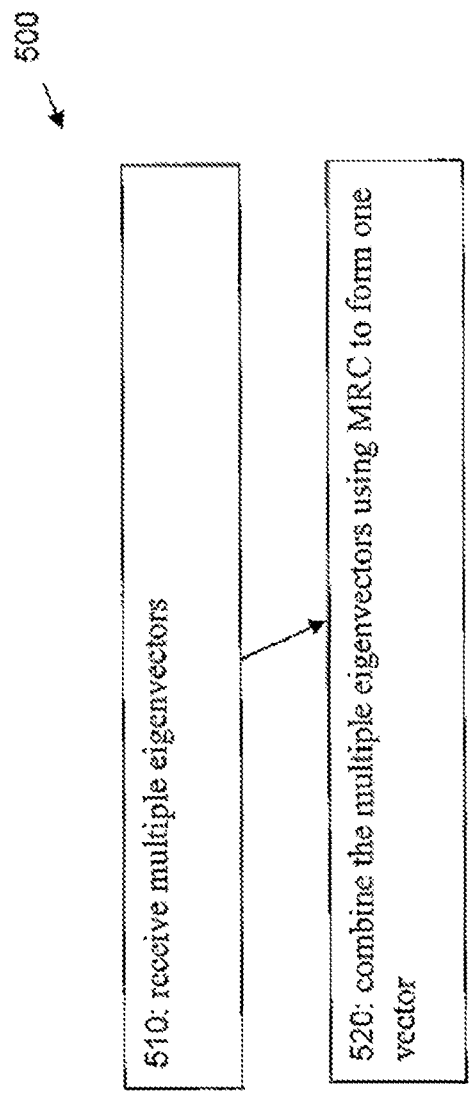
FIG. 5 shows an example of a method which may be performed by an apparatus.

Referring to FIG. 5 an example method for combining eigenvectors, for example with respect to implementing block 220 of method 200, is shown.

When combing eigenvectors, as described above with respect to block 220 of method 200, if multiple eigenvectors result from the first part at block 210 of method 200, as shown at block 510, the multiple eigenvectors may be combined into one feedback vector using MRC, as shown at block 520. Multiple eigenvectors span an orthogonal subspace and may be used as an orthogonal basis in determining one feedback vector. Combining the selected eigenvectors by adding them together allows the system or reporting device (for example, UE 110, etc.) to achieve diversity gain. The eigenvalues represent the power gains of the channel paths. The reporting device may use MRC to combine the selected eigenvectors with eigenvalues as the combining coefficients as follows:

$$U = \sum_{j=0}^{i} \sqrt{\lambda_j} U_j \quad (8)$$

The resulting feedback vector U may be normalized to U* and then an explicit CSI feedback procedure can be triggered to report U* to the eNB 170 (or gNB).

Figure 6:
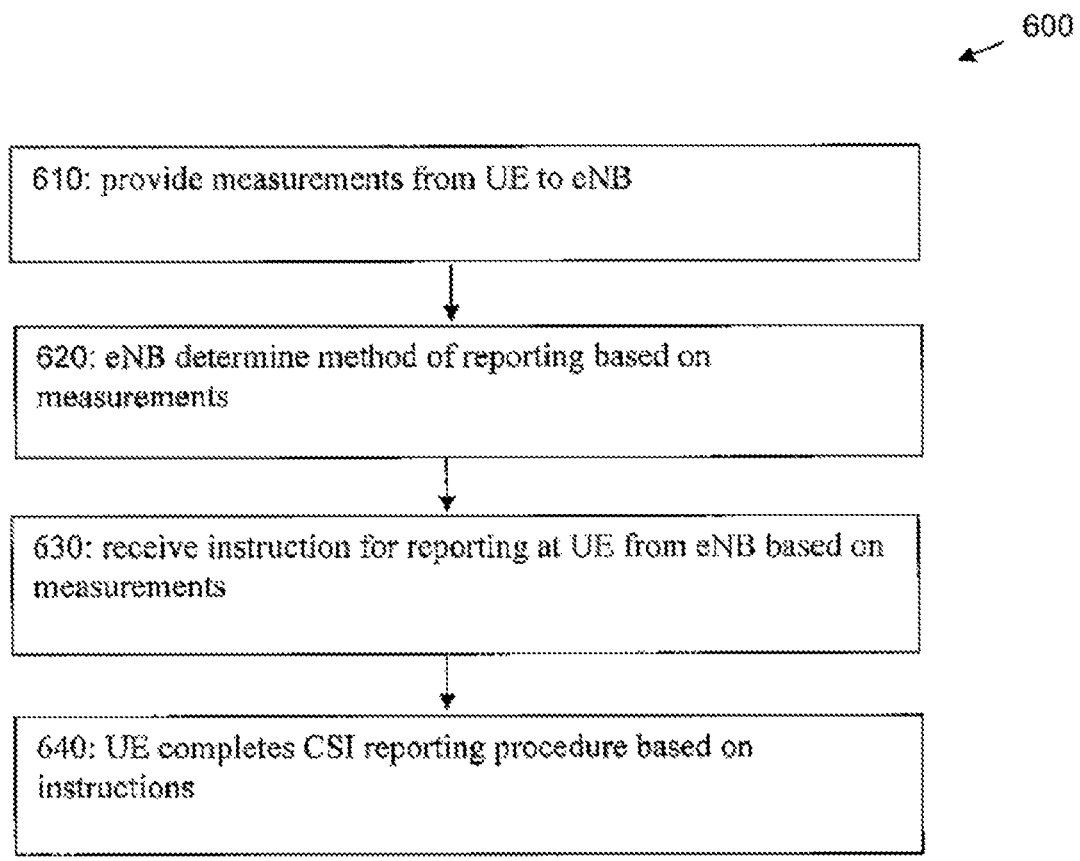
FIG. 6 shows an example of a method which may be performed by an apparatus.

Referring to FIG. 6 an example method for performing the measurements and signalling to enable the explicit CSI reporting (or handling the measurements and the signalling for explicit CSI reporting), for example with respect to implementing block 230 of method 200, is shown.

The number of combined eigenvectors may be determined based on measurements of the angular spread and UE 110 speed as described above with respect to FIG. 4 and method 400. CSI feedback may be triggered by the eNB 170 (or gNB), and the UE 110 may in response perform the measurement and report the resulting one vector back to the eNB 170 (or gNB).

Alternatively, as shown at block 610, the UE 110 may report the measurements, particularly the speed, back to the eNB 170 (or gNB) and let the eNB 170 (or gNB) determine the method of reporting, such as whether the combined method is to be applied in that particular instance (as shown at block 620).

At block 630, the method may include the UE 110 receiving a signal (or message) with instructions for applying the combined method (based on the determination by the eNB 170 (or gNB)).

At block 640, the method may include the UE 110 following the instruction of the eNB 170 (or gNB) and completing the CSI reporting procedure. Having UEs 110 feedback their speed measurements and letting eNB 170 (or gNB) determine whether the combined reporting method is to be applied (for example, the feature is to be enabled) provides additional utility than allowing the UE 110 to make the decision, because in instances in which the eNB 170 (or gNB) makes the determination, the eNB 170 (or gNB) may collect information from all UEs 110 in a cell and better schedule and coordinate CSI reporting among the UEs 110.

According to an embodiment, an explicit CSI feedback method reports either one dominant eigenvector or one vector combining all selected eigenvectors. To determine the number of combined eigenvectors, UE 110 speed and the eNB 170 (or gNB) angular spread may be used as a metric. MRC may be used as the combining method to combine all relevant eigenvectors into one feedback vector. The explicit CSI feedback method may provide more diversity gain in a high UE 110 speed scenario and comparatively less cost overhead when angular spread is high.

Certain abbreviations that may be found in the description and/or in the Figures are herewith defined as follows:
BI Beam Indicator
CQI Channel Quality Indicator
CRS Common (Cell-specific) Reference Signal
CSI Channel State Information
CSI-RS Channel State Information Reference Signal
BLER Block Error Rate
DCI Downlink Control Information
DL Downlink
DM RS Demodulation Reference Signal (User specific)
eNB, eNodeB Evolved Base Station
gNB, gNodeB Next generation Base Station
HARQ Hybrid Automatic Repeat Request
LTE Long Term Evolution
MIMO Multiple Input Multiple Output
MU Multi User
MRC Max Ratio Combing
NR New Radio
NZP Non Zero Power
PCID Physical Cell ID
PDCCH Physical Downlink Control Channel
PDSCH Physical Downlink Shared Channel
PMI Precoding Matrix Indicator
PMI-RS Precoding Matrix Indicator Reference Signal (Precoded RS for PMI
PRB selection)
PUCCH Physical Resource Block
PUSCH Physical Uplink Control Channel
Physical Uplink Shared Channel
QAM Quadrature Amplitude Modulation
QPSK Quadrature Phase-Shift Keying
RE Resource Element
RI Rank Indicator
RRC Radio Resource Control
RNTI Radio Network Temporary Identifier
SNR Signal to Noise Ratio
SINR Signal to Interference plus Noise Ratio
SOI Subframe Offset Indicator
TB Transport Block
TBS Transport Block Size
TDD Time Division Duplexing
TTI Transmission Time Interval
UE User Equipment, e.g. mobile terminal
UL Uplink
VCI Virtual Channel Identifier Without in any way limiting the scope, interpretation, or application of the claims appearing below, a technical effect of one or more of the example embodiments disclosed herein is a diversity gain comparable (or approximate) to multiple eigenvectors being reported in a high eNB/gNB angular spread or high UE speed scenario. Another technical effect of one or more of the example embodiments disclosed herein is high beamforming gain comparable (or approximate) to a dominant eigenvector being reported in a low eNB/gNB angular spread and low UE speed scenario.

An apparatus comprising, means for determining a number of eigenvectors to be used in providing a single vector to include in an explicit channel state information (CSI) report, to be transmitted from a user terminal to at least one device in a network, means for combining the eigenvectors to form the single vector in response to a determination that the number of eigenvectors to be used in providing the single vector is greater than one, and means for configuring to signal to transmit the explicit CSI report including the single vector from the user terminal to the at least one device in the network.

An example method may comprise evaluating a number of constituent precoders to be used in providing a single precoder to include in an explicit channel state information (CSI) report, to be transmitted from a user terminal to at least one device in a network, combining the constituent precoders to form the single precoder in response to a determination that the number of constituent precoders to be used in providing the single precoder is greater than one, and configuring to signal to transmit the explicit CSI report including the single precoder from the user terminal to the at least one device in the network.

The constituent precoders may comprise eigenvectors and the single precoder may comprise at least one of a dominant eigenvector and a single vector combined of several eigenvectors The determining of the number of eigenvectors to be used in providing the single vector may further comprise determining an angular spread associated with the at least one device in the network.

The determining the angular spread may further comprise determining an angular spread associated with the at least one device in the network based on eigen-decomposition of a channel covariance matrix.

The determining the angular spread may further comprise determining whether $\lambda_0-\lambda_i<\rho$ and $s(U_0)-s(U_i)<\xi$, where threshold p denotes a power gain difference and threshold $\xi$ denotes a steering direction difference; and selecting eigenvector $U_i$ to be included in the number of vectors in response to a determination that $\lambda_0-\lambda_i<\rho$ and $s(U_0)-s(U_i)<\xi$, where $s(*)$ represents a function abstracting a steering direction of the user terminal.

An example method may further comprise determining whether i=0; and reporting only a dominant eigenvector in response to a determination that i=0.

An example method may further comprise determining whether i≥1; and combining eigenvectors $U_0, \ldots U_i$ into one vector and reporting the one vector in response to a determination that i≥1.

The determining the number of eigenvectors to be used in providing the single vector may farther comprise accessing a user terminal speed threshold, where the user terminal speed threshold is denoted as τ, determining a user terminal speed, v, of the user terminal; and switch enabling the combined vector feedback if the user terminal speed v≥τ and enabling combined vector feedback.

The determining the user terminal speed of the user terminal may farther comprise determining the user terminal speed based on a Doppler offset, where $$\Delta f = \frac{v}{c} f_0,$$

where, $\Delta f$ is the Doppler offset, $f_0$ is a carrier frequency and c is a speed of light.

The combining the eigenvectors to form the single vector may further comprise applying MRC to combine the eigenvectors with eigenvalues as the combining coefficients.

The determining the number of eigenvectors to be used in providing the single vector to include in the explicit CSI report based on eigen-decomposition of the channel covariance matrix may further comprise applying eigen-decomposition to R, where U denotes an eigenvector, Λ denotes an eigenvalue, $U_0$ denotes a dominant eigenvector and $\lambda_0$ denotes a dominant eigenvalue, and $$R=U\Lambda U^H,$$

$$\Lambda=(\lambda_0, \lambda_1, \ldots, \lambda_N), \text{ and}$$

$$U=(U_0, U_1, \ldots, U_N).$$

The configuring to signal to transmit the explicit CSI report may further comprise reporting a user terminal speed from the user terminal to the at least one device in the network, where the at least one device in the network is configured to determine whether to combine the eigenvectors based on the user terminal speed, configuring to receive instructions from the at least one device in the network to combine the eigenvectors, combining the eigenvectors, and configuring to send the explicit CSI report to the at least one device in the network including the combined eigenvectors.

An example apparatus may comprise at least one processor; and at least one non-transitory memory including computer program code, the at least one memory and the computer program code may be configured to, with the at least one processor, cause the apparatus to: determine a number of eigenvectors to be used in providing a single vector to include in an explicit channel state information (CSI) report, to be transmitted from a user terminal to at least one device in a network, combine the eigenvectors to form the single vector in response to a determination that the number of eigenvectors to be used in providing the single vector is greater than one; and perform measurements and signalling to transmit the explicit CSI report including the single vector from the user terminal to the at least one device in the network.

When determining the number of eigenvectors to be used in providing the single vector, the at least one memory and the computer program code may be configured to determine an angular spread associated with the at least one device in the network based on eigen-decomposition of a channel covariance matrix.

When determining the angular spread, the at least one memory and the computer program code may be configured to, with the at least one processor, cause the apparatus to attempt to determine whether $\lambda_0-\lambda_i<\rho$ and $s(U_0)-s(U_i)<\xi$, where threshold p denotes a power gain difference and threshold ξ denotes a steering direction difference; and select eigenvector $U_i$ to be included in the number of vectors in response to a determination that $\lambda_0-\lambda_i<\rho$ and $s(U_0)-s(U_i)<\xi$, where $s(*)$ represents a function abstracting a steering direction of the user terminal.

The at least one memory and the computer program code may be further configured to determine whether i=0; and report only a dominant eigenvector in response to a determination that i=0.

The at least one memory and the computer program code may be further configured to determine whether i≥1; and combine eigenvectors $U_0, \ldots U_i$ into one vector and reporting the one vector in response to a determination that i≥1.

When determining the number of eigenvectors to be used in providing the single vector, the at least one memory and the computer program code may be configured to, with the at least one processor, cause the apparatus to access a user terminal speed threshold, where the user terminal speed threshold is denoted as τ; determine a user terminal speed, v, of the user terminal; and switch enable the combined vector feedback if the user terminal speed v≥τ and enabling combined vector feedback.

When determining the user terminal speed of the user terminal, the at least one memory and the computer program code may be configured to, with the at least one processor, cause the apparatus to determine the user terminal speed based on a Doppler offset, where $$\Delta f = \frac{v}{c} f_0,$$

where, $\Delta f$ is the Doppler offset, $f_0$ is a carrier frequency and c is a speed of light.

When combining the eigenvectors to form the single vector, the at least one memory and the computer program code may be configured to, with the at least one processor, cause the apparatus to apply MRC to combine the eigenvectors with eigenvalues as the combining coefficients.

When determining the number of eigenvectors to be used in providing the single vector to include in the explicit CSI report based on eigen-decomposition of the channel covariance matrix, the at least one memory and the computer program code may be configured to, with the at least one processor, cause the apparatus to apply eigen-decomposition to R, where U denotes an eigenvector, Λ denotes an eigenvalue, $U_0$ denotes a dominant eigenvector and $\lambda_0$ denotes a dominant eigenvalue, and $R=U\Lambda U^H$, $\Lambda=(\lambda_0, \lambda_1, \ldots, \lambda_N)$, and $U=(U_0, U_1, \ldots, U_N)$.

A non-transitory computer program product may comprise a computer-readable medium bearing computer program code embodied therein for use with a computer, the computer program code comprising code for determining a number of eigenvectors to be used in providing a single vector to include in an explicit channel state information (CSI) report, to be transmitted from a user terminal to at least one device in a network; combining the eigenvectors to form the single vector in response to a determination that the number of eigenvectors to be used in providing the single vector is greater than one; and configuring to signal to transmit the explicit CSI report including the single vector from the user terminal to the at least one device in the network.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects are set out above, other aspects comprise other combinations of features from the described embodiments, and not solely the combinations described above.

It is also noted herein that while the above describes example embodiments, these descriptions should not be viewed in a limiting sense. Rather, there are several variations and modifications which may be made without departing from the scope of the present invention.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications which may be made without departing from the scope of the present invention as defined in the appended claims.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

The invention claimed is:

1. A method, comprising:
   evaluating, using circuitry of a user terminal, a number of constituent precoders to be used in providing a single precoder to include in an explicit channel state information report, to be transmitted from the user terminal to at least one device in a network;
   wherein the evaluating of the number of constituent precoders to be used in providing the single precoder is at least partially based on a measurement using the user terminal comprising: a speed of the user terminal, and/or an angular spread associated with the at least one device in the network;
   determining, using the circuitry of the user terminal, the number of constituent precoders based on the user terminal measurement;

wherein the constituent precoders comprise eigenvectors and the single precoder comprises at least one of a dominant eigenvector and a single vector combined of several eigenvectors;

wherein determining a number of eigenvectors to be used in providing the single vector comprises determining the angular spread associated with the at least one device in the network based on eigen-decomposition of a channel covariance matrix;

determining that the single precoder is the dominant eigenvector, in response to a determination that the number of constituent precoders to be used in providing the single precoder is equal to or less than one;

determining the angular spread based on: a power gain difference between respective eigenvalues of the eigenvectors and a dominant eigenvalue; and a steering direction difference between respective eigenvectors and the dominant eigenvector;

combining the constituent precoders to form the single precoder in response to a determination that the number of constituent precoders to be used in providing the single precoder is greater than one; and configuring a signal to transmit the explicit channel state information report including the single precoder from the user terminal to the at least one device in the network.

2. The method of claim 1, wherein determining the angular spread further comprises:

determining whether $\lambda_0 - \lambda_i < \rho$ and $s(U_0) - s(U_i) < \xi$, where threshold $\rho$ denotes the power gain difference between eigen values $\lambda_0$ and $\lambda_i$ and threshold $\xi$ denotes the steering direction difference between eigenvectors; and selecting eigenvector $U_i$ to be included in the number of eigenvectors in response to a determination that $\lambda_0 - \lambda_1 < \rho$ and $s(U_0) - s(U_i) < \xi$, where $s(*)$ represents a function abstracting a steering direction of an eigenvector, and i represents an eigenvector index.

3. The method of claim 2, further comprising:
determining whether i=0; and
reporting only the dominant eigenvector in response to a determination that i=0.

4. The method of claim 2, further comprising:
determining whether i≥1; and
combining eigenvectors $U_0, \ldots U_i$ into one vector and reporting the one vector in response to a determination that i≥1.

5. The method of claim 1, wherein determining the number of eigenvectors to be used in providing the single vector further comprises:

accessing a user terminal speed threshold, where the user terminal speed threshold is denoted as $\tau$;
determining the user terminal speed, v, of the user terminal; and
enabling the combined vector feedback if the user terminal speed v≥τ.

6. The method of claim 1, wherein determining the number of eigenvectors to be used in providing the single vector to include in the explicit channel state information report further comprises:

applying eigen-decomposition to R, where U denotes an eigenvector, $\Lambda$ denotes an eigenvalue, $U_0$ denotes the dominant eigenvector and $\lambda_0$ denotes the dominant eigenvalue, H denotes a Hermitian operator, and $R = U \Lambda U^H$, $\Lambda = (\lambda_0, \lambda_1, \ldots, \lambda_N)$, and $U = (U_0, U_1, \ldots, U_N)$.

7. The method of claim 1, wherein signaling to transmit the explicit channel state information report further comprises:

reporting the user terminal speed from the user terminal to the at least one device in the network, where the at least one device in the network is configured to determine whether to combine the eigenvectors based on the user terminal speed;

configuring to receive instructions from the at least one device in the network to combine the eigenvectors;

combining the eigenvectors; and configuring to send the explicit channel state information report to the at least one device in the network including the combined eigenvectors.

8. An apparatus, comprising:
at least one processor; and
at least one non-transitory memory including computer program code,
the at least one memory and the computer program code configured to, with the at least one processor, cause the apparatus to at least:

evaluate, using circuitry of a user terminal, a number of constituent precoders to be used in providing a single vector to include in an explicit channel state information report, to be transmitted from the user terminal to at least one device in a network;

wherein the evaluating of the number of constituent precoders to be used in providing the single precoder is at least partially based on a measurement using the user terminal comprising: a speed of the user terminal, and/or an angular spread associated with the at least one device in the network;

determine, using the circuitry of the user terminal, the number of constituent precoders based on the user terminal measurement;

wherein the constituent precoders comprise eigenvectors and the single precoder comprises at least one of a dominant eigenvector and a single vector combined of several eigenvectors;

wherein determining a number of eigenvectors to be used in providing the single vector comprises determining the angular spread associated with the at least one device in the network based on eigen-decomposition of a channel covariance matrix;

determine that the single precoder is the dominant eigenvector, in response to a determination that the number of constituent precoders to be used in providing the single precoder is equal to or less than one;

determine the angular spread based on: a power gain difference between respective eigenvalues of the eigenvectors and a dominant eigenvalue; and a steering direction difference between respective eigenvectors and the dominant eigenvector;

combine the constituent precoders to form the single vector in response to a determination that the number of constituent precoders to be used is greater than one; and configure a signal to transmit the explicit channel state information report including the single precoder from the user terminal to the at least one device in the network.

9. The apparatus of claim 8, where, when determining the angular spread, the at least one memory and the computer program code are configured to, with the at least one processor, cause the apparatus to:

determining whether $\lambda_0-\lambda_i<\rho$ and $s(U_0)-s(U_i)<\xi$,
where threshold $\rho$ denotes the power gain difference between eigen values $\lambda_0$ and $\lambda_i$ and threshold $\xi$ denotes the steering direction difference between eigenvectors; and select eigenvector $U_i$ to be included in the number of eigenvectors in response to a determination that $\lambda_0-\lambda_i<\rho$ and $s(U_0)-s(U_i)<\xi$,
where s(*) represents a function abstracting a steering direction of an eigenvector, and i represents an eigenvector index.

10. The apparatus of claim 9, where the at least one memory and the computer program code are further configured to, with the at least one processor, cause the apparatus to:
determine whether i=0; and
report only the dominant eigenvector in response to a determination that i=0.

11. The apparatus of claim 9, where the at least one memory and the computer program code are further configured to, with the at least one processor, cause the apparatus to:
determine whether i≥1; and
combine eigenvectors $U_0, \ldots U_i$ into one vector and report the one vector in response to a determination that i≥1.

12. The apparatus of claim 8, where, when determining the number of eigenvectors to be used in providing the single vector, the at least one memory and the computer program code are configured to, with the at least one processor, cause the apparatus to:
access a user terminal speed threshold, where the user terminal speed threshold is denoted as $\tau$;
determine the user terminal speed, v, of the user terminal; and
enable the combined vector feedback if the user terminal speed v≥τ.

13. The apparatus of claim 12, where, when determining the user terminal speed of the user terminal, the at least one memory and the computer program code are configured to, with the at least one processor, cause the apparatus to:
determine the user terminal speed based on a Doppler offset, where $$\Delta f = \frac{v}{c}f_0,$$

where, $\Delta f$ is the Doppler offset, $f_0$ is a carrier frequency and c is a speed of light.

14. The apparatus of claim 8, where, when combining the eigenvectors to form the single vector, the at least one memory and the computer program code are configured to, with the at least one processor, cause the apparatus to:
apply maximum ratio combining to combine the eigenvectors with eigenvalues as the combining coefficients.

15. A non-transitory computer readable medium encoded with instructions that, when executed by a computer, cause performance of:
evaluating, using circuitry of a user terminal, a number of constituent precoders to be used in providing a single precoder to include in an explicit channel state information report, to be transmitted from the user terminal to at least one device in a network;
wherein the evaluating of the number of constituent precoders to be used in providing the single precoder is at least partially based on a measurement using the user terminal comprising: a speed of the user terminal, and/or an angular spread associated with the at least one device in the network;
determining, using the circuitry of the user terminal, the number of constituent precoders based on the user terminal measurement;
wherein the constituent precoders comprise eigenvectors and the single precoder comprises at least one of a dominant eigenvector and a single vector combined of several eigenvectors;
wherein determining a number of eigenvectors to be used in providing the single vector comprises determining the angular spread associated with the at least one device in the network based on eigen-decomposition of a channel covariance matrix;
determining that the single precoder is the dominant eigenvector, in response to a determination that the number of constituent precoders to be used in providing the single precoder is equal to or less than one;
determining the angular spread based on: a power gain difference between respective eigenvalues of the eigenvectors and a dominant eigenvalue; and a steering direction difference between respective eigenvectors and the dominant eigenvector;
combining the constituent precoders to form the single precoder in response to a determination that the number of constituent precoders to be used in providing the single precoder is greater than one; and
configuring a signal to transmit the explicit channel state information report including the single precoder from the user terminal to the at least one device in the network.

* * * * *